F. G. KOEHLER.
SHOCK ABSORBER FOR VEHICLES.
APPLICATION FILED MAY 7, 1908.
944,676.
Patented Dec. 28, 1909.
2 SHEETS—SHEET 1.
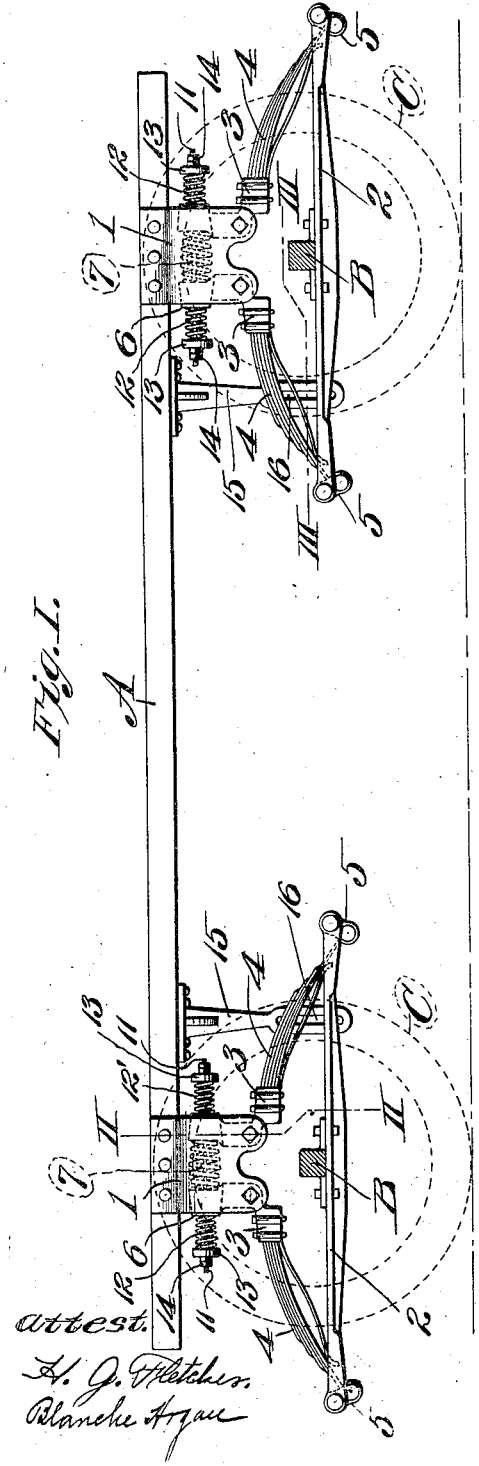
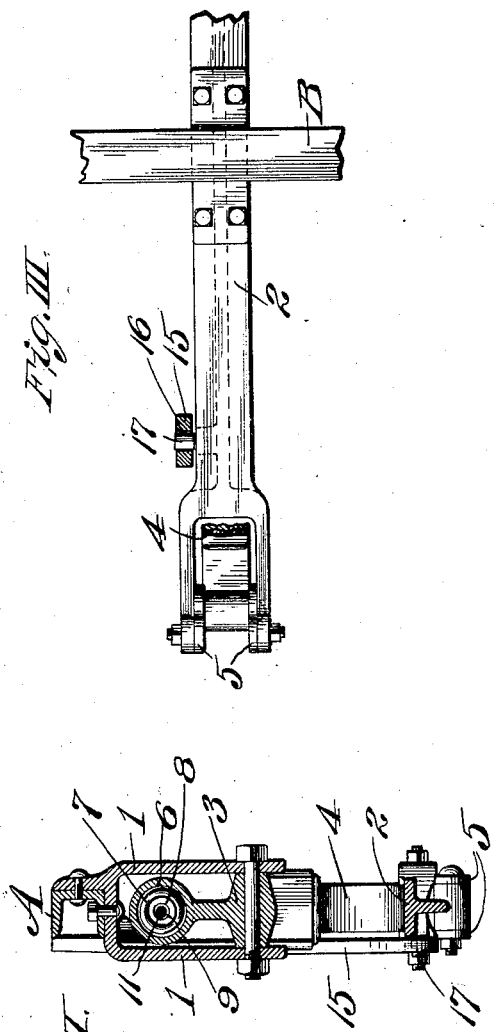
Inventor.
F. G. Koehler.

F. G. KOEHLER.
SHOCK ABSORBER FOR VEHICLES.
APPLICATION FILED MAY 7, 1908.
944,676.
Patented Dec. 28, 1909.
2 SHEETS—SHEET 2.
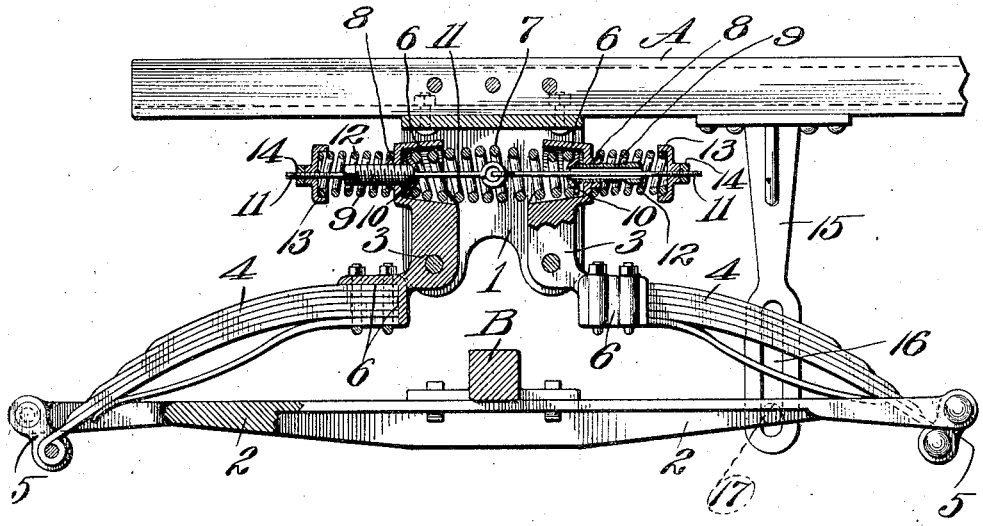
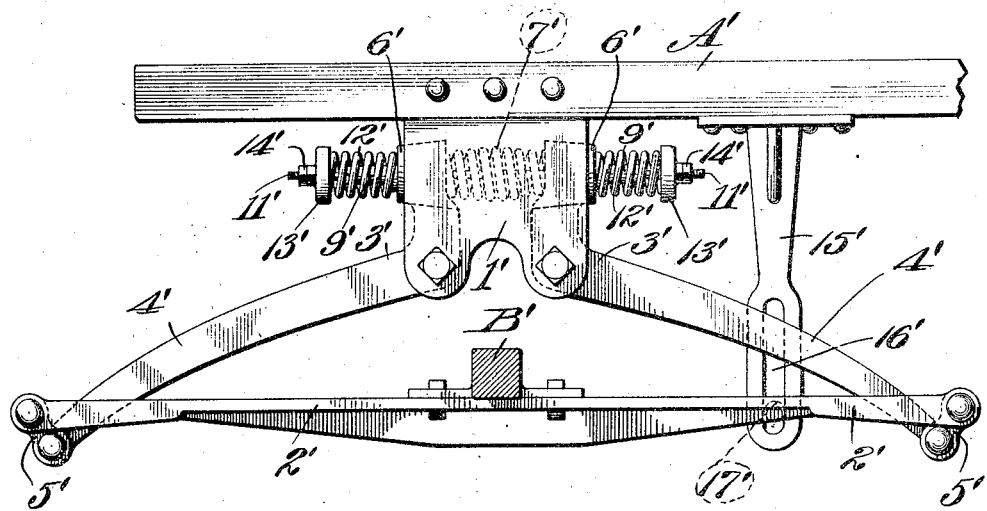

UNITED STATES PATENT OFFICE.

FRANK G. KOEHLER, OF ST. LOUIS, MISSOURI.

SHOCK-ABSORBER FOR VEHICLES.

944,676.

Specification of Letters Patent.   Patented Dec. 28, 1909.

Application filed May 7, 1908. Serial No. 431,345.

*To all whom it may concern:*

Be it known that I, FRANK G. KOEHLER, a citizen of the United States of America, residing at the city of St. Louis, in the State of Missouri, have invented certain new and useful Improvements in Shock-Absorbers for Vehicles, of which the following is a full, clear, and exact description, reference being had to the accompanying drawing, forming part of this specification.

My invention relates to that character of devices utilized in vehicles for the purpose of minimizing the shock transferred from the ground wheels of the vehicles to the body frames thereof.

Figure I is in part an elevation and in part a vertical longitudinal section of a vehicle having my shock absorbing devices incorporated therein. Fig. II is an enlarged vertical transverse section taken on line II—II, Fig. I. Fig. III is an enlarged horizontal section taken on line III—III, Fig. I. Fig. IV is an enlarged vertical longitudinal section of one of my shock absorbers together with a portion of the frame and axle of a vehicle to which it is applied. Fig. V is a side elevation of a portion of a vehicle frame and axle, showing my shock absorber, in a slightly modified form, applied thereto.

A designates the body frame, B the axles, and C the ground wheels of a vehicle. As the vehicle is equipped with four of my improved shock absorbers, all of which are analogous, I will confine the description to but one of them.

1 designates a hanger, preferably of inverted U-shape, secured to the frame A in any suitable manner, and 2 is a cross bar secured to the axle of the vehicle.

3 designate bell crank levers pivotally supported by the hanger 1. One of the arms of each of these bell crank levers is provided with a pocket to receive one end of a main spring 4, secured thereto by a U-shaped bolt, the other or outer end of said spring being connected to a link 5, pivotally mounted within a bifurcated end of the cross bar 2. The other member of each of the bell crank levers 3, which are preferably approximately vertically disposed, is provided with a cup shaped spring seat socket 6, designed to receive an end of a compression spring 7. Each of the spring seat sockets of the bell crank levers is provided with a screw thread perforation 8, engaged by hollow adjusting screws 9, having rounded inner ends against which fit spring seat washers.

11 designates draw rods which pass through the hollow adjusting screws 9 and through the compression spring 7, said rods being joined at their inner ends by interlocking eyes.

12 designates take-up springs arranged outside of, and bearing against the cup shaped spring seat sockets of the bell crank levers 3, said springs being positioned around the protruding ends of the adjusting screws 9 and rods 11.

13 designates spring seat caps having threaded engagement with the outer screw threaded ends of the draw rods 11, and are designed to act as seats for the outer ends of the take-up springs 12 and upon proper manipulation of these caps, the tension desired on said springs may be varied. The spring seat caps 13 are locked in the position desired by suitable jam nuts 14 as is clearly illustrated in Fig. IV of the drawings.

The hollow adjusting screws 9 are each provided with a wrench seat whereby they may be rotated to adjust the spring seat washers 10 and thereby produce more or less tension on the compression spring 7. The spring 7 acts in compression and serves to carry the load of the machine while the springs 12 are mere take-up or cushion springs and act to check any rebound that there may be. The nuts 14 and caps 13 have nothing to do with confining the compression spring 7 and even if they should become lost the machine would still be in good running condition.

15 designates a guide and brace member bolted or otherwise secured to the frame A, said member being provided with a vertical slot 16 in which operates a stud 17 carried by the cross bar 2, and by which construction approximately vertical alinement between the ground wheel and the vehicle body frame is maintained.

In the modified form of the invention illustrated in Fig. V of the drawings, it will be observed that I have dispensed with the laminated springs, and have formed one of the members 4' of each of the bell crank levers 3' of sufficient length to pivotally engage the links 5'. In other respects the construction of the shock absorber is precisely like that of the construction previously described and wherein like parts bear like reference characters to said previously described parts, but having suffix primes.

I claim:

1. In a shock absorbing device, the combination with a vehicle body and axle, of a hanger carried by said body, bell crank levers pivotally connected to said hanger, a support carried by said axle, links pivotally connected to said support and to which links one arm of each of the bell crank levers is pivotally connected, and resilient means interposed between the other arms of said bell crank levers, substantially as set forth.

2. In a shock absorbing device, the combination with a vehicle body and axle, of a hanger carried by said body, bell crank levers pivotally connected to said hanger and each having an arm of resilient material, a support carried by said axle, links pivotally connected to said support and to which links the said resilient arms are pivotally connected, and resilient means interposed between the other arms of said bell crank levers, substantially as set forth.

3. In a shock absorbing device, the combination with a vehicle body and axle, of a support carried by said axle, links pivotally connected to said support, bell crank levers pivotally supported by said vehicle body, one arm of each of said bell crank levers being pivotally connected to said links, resilient means interposed between the other arms of said levers, a rod extending through the said resilient means and arms, resilient means located to the outside of said arms and surrounding said rod, spring seat members carried by said rods and which bear against the ends of said last mentioned resilient means, and means for retaining said spring seat members in a desired position, substantially as set forth.

4. In a shock absorbing device for vehicles, the combination with a vehicle body and axle, pivoted bell crank levers, body carrying springs connected to said bell crank levers, a compression spring located between those ends of the bell crank levers that are not attached to the body carrying springs, and screws passing through said bell crank levers and having seats on their inner ends that bear against said compression spring, substantially as set forth.

5. In a shock absorbing device for vehicles, the combination with a vehicle body and axle, pivoted bell crank levers, body carrying springs connected to said bell crank levers, a compression spring located between those ends of the bell crank levers that are not attached to the body carrying springs, cushioning springs located outside of the ends of the bell crank levers between which the compression spring is located, hollow screws having threaded connection with said bell crank levers and having seats on their inner ends that bear against the compression spring, and a rod having nuts on its outer ends and which passes through said cushioning springs, through the bell crank levers, through the hollow screws and through the compression spring, substantially as set forth.

6. In a shock absorbing device, the combination with a vehicle body and axle, of a support carried by said axle, links pivotally connected to said support, bell crank levers pivotally supported by said vehicle body, one arm of each of said bell crank levers being pivotally connected to said links, resilient means interposed between the other arms of said levers, means for adjusting the tension of said resilient means, a rod extending through the resilient means and through said arms, resilient means located to the outside of said arms and surrounding said rod, spring seat members carried by said rods and which bear against the ends of said last mention resilient means, and means for adjusting said spring seat members on said rods to regulate the tension of said last mentioned resilient means, substantially as set forth.

FRANK G. KOEHLER.

In presence of—
BLANCHE HOGAN,
H. G. COOK.